US011105301B2

(12) United States Patent
 Coton et al.

(10) Patent No.: US 11,105,301 B2
(45) Date of Patent: Aug. 31, 2021

(54) PRESSURE REGULATING DEVICE AND METHOD FOR ASSEMBLING SAME, FOR A FUEL VAPOUR ABSORBER

(71) Applicant: SOGEFI FILTRATION, Guyancourt (FR)

(72) Inventors: Benjamin Coton, Paris (FR); Farid Ladimat, Acheres (FR); Baptiste Fonnard, Giberville (FR); Marouane Sghiouar, Vire (FR)

(73) Assignee: SOGEFI FILTRATION, Guyancourt (FR)

( * ) Notice: Subject to any disclaimer, the term of this patent is extended or adjusted under 35 U.S.C. 154(b) by 0 days.

(21) Appl. No.: 16/635,708

(22) PCT Filed: Jul. 20, 2018

(86) PCT No.: PCT/FR2018/051852
 § 371 (c)(1),
 (2) Date: Jan. 31, 2020

(87) PCT Pub. No.: WO2019/025696
 PCT Pub. Date: Feb. 7, 2019

(65) Prior Publication Data
 US 2021/0131383 A1 May 6, 2021

(30) Foreign Application Priority Data
 Aug. 2, 2017 (FR) ..................................... 17 57419

(51) Int. Cl.
 *F02M 25/00* (2006.01)
 *F02M 25/08* (2006.01)
 (Continued)

(52) U.S. Cl.
 CPC .... *F02M 25/0854* (2013.01); *F02M 25/0836* (2013.01); *B60K 15/03504* (2013.01);
 (Continued)

(58) Field of Classification Search
 CPC ........... F02M 25/0854; F02M 25/0836; B60K 15/03519; B60K 15/03504;
 (Continued)

(56) References Cited

U.S. PATENT DOCUMENTS 4,149,504 A * 4/1979 Walters .............. F02M 25/0854
 123/520
4,173,207 A * 11/1979 Hiramatsu ......... F02M 25/0854
 123/519
(Continued)

FOREIGN PATENT DOCUMENTS

EP 1702785 A1 9/2006
WO 2011067753 A2 6/2011

OTHER PUBLICATIONS

International Search Report dated Oct. 31, 2018, from corresponding PCT application No. PCT/FR2018/051852.

*Primary Examiner* — Phutthiwat Wongwian
*Assistant Examiner* — Sherman D Manley
(74) *Attorney, Agent, or Firm* — Nixon & Vanderhye

(57) ABSTRACT

The fuel vapor absorber includes, on a housing member and separately from an air inlet, an orifice for the circulation of fuel vapors coming from a tank. A pipe for supplying these vapors passes through the housing member via the orifice and forms a support for a pressure regulating valve, provided with a valve body and a closure member. The pipe, provided for adaptation between the valve and the housing, is fastened to the housing member, forming at least one annular sealing area surrounding the pipe. The valve, which is fastened by snap-fitting or the like, may be housed in the inside volume of the absorber, where an absorption product is stored. The pipe is typically mounted on the inner face side of the housing member and may be directly welded.

19 Claims, 4 Drawing Sheets

(51) Int. Cl.
*B60K 15/035* (2006.01)
*B60K 15/03* (2006.01)

(52) U.S. Cl.
CPC .................. *B60K 15/03519* (2013.01); *B60K 2015/03296* (2013.01); *B60K 2015/03467* (2013.01); *B60K 2015/03514* (2013.01)

(58) Field of Classification Search
CPC ........... B60K 2015/03467; B60K 2015/03514; B60K 2015/03296
See application file for complete search history.

(56) References Cited

U.S. PATENT DOCUMENTS

| | | | | |
|---|---|---|---|---|
| 4,331,120 A * | 5/1982 | Hiramatu | ........... | F02M 25/0854 123/519 |
| 4,338,106 A * | 7/1982 | Mizuno | .............. | F02M 25/0854 123/519 |
| 4,403,587 A * | 9/1983 | Mizuno | .............. | F02M 25/0854 123/519 |
| 4,454,849 A * | 6/1984 | Mizuno | .............. | F02M 25/0854 123/519 |
| 4,507,132 A * | 3/1985 | Yoshida | .............. | F02M 25/0854 123/519 |
| 5,809,978 A * | 9/1998 | Krimmer | ........... | F02M 25/0836 123/519 |
| 5,878,729 A * | 3/1999 | Covert | ................ | F02M 25/0809 123/520 |
| 6,230,693 B1 * | 5/2001 | Meiller | .............. | F02M 25/0854 123/519 |
| 6,390,073 B1 | 5/2002 | Meiller et al. | | |
| 7,527,044 B2 * | 5/2009 | Dunkle | .............. | F02M 25/0854 123/519 |
| 8,950,382 B2 | 2/2015 | Vulkan et al. | | |
| 2006/0207576 A1 * | 9/2006 | Mills | ................. | B60K 15/03519 123/519 |
| 2009/0293726 A1 | 12/2009 | Ammermann | | |
| 2020/0398661 A1 * | 12/2020 | Mills | ................. | B60K 15/03519 |

* cited by examiner

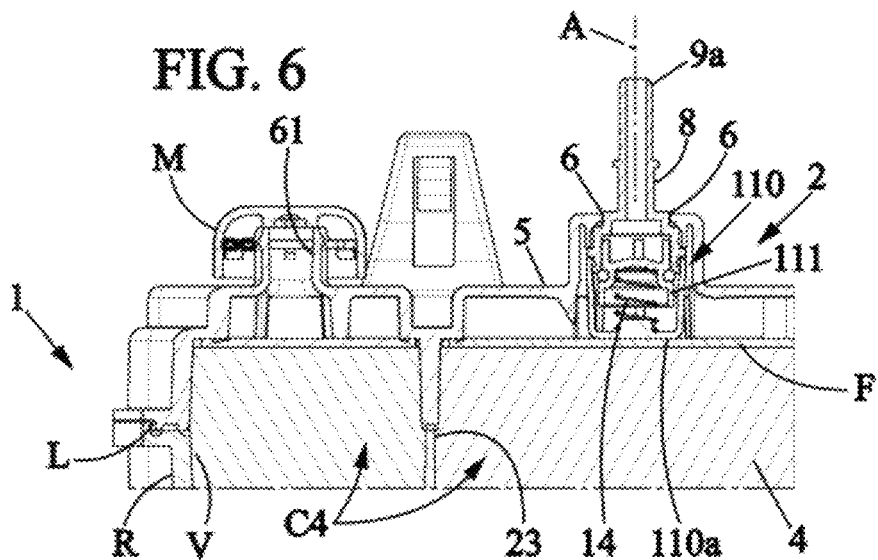
FIG. 6
FIG. 7
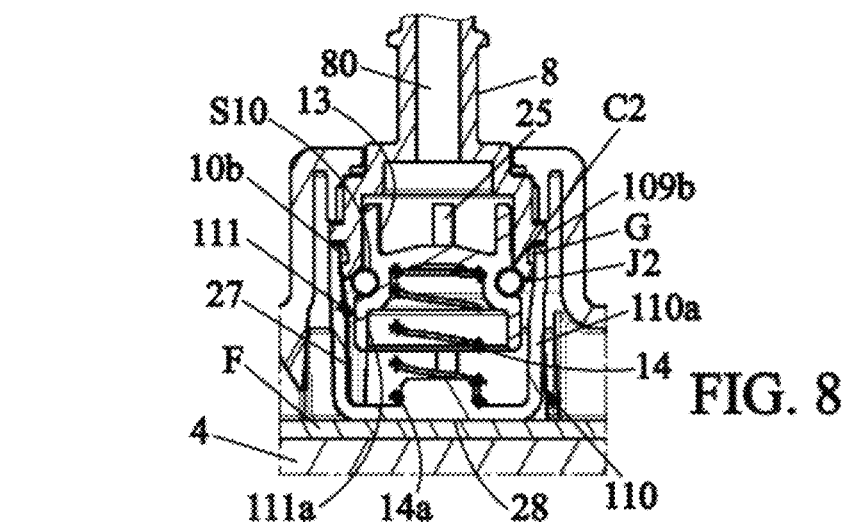
FIG. 8

PRESSURE REGULATING DEVICE AND METHOD FOR ASSEMBLING SAME, FOR A FUEL VAPOUR ABSORBER

FIELD OF THE INVENTION

The present invention relates to devices for treating fuel vapors emanating from a fuel tank, typically for a fuel tank of an internal combustion vehicle (for example cars, trucks, motorcycles, boats) or of an industrial heat engine. The field of application of the invention relates in particular to pressure regulating devices forming part of a gasoline vapor absorber and the methods of assembling such devices.

BACKGROUND OF THE INVENTION

In a manner that is known per se, a fuel vapor absorber (in particular for absorbing gasoline vapors) makes it possible to adsorb vapors on an adsorbent material generally having high porosity. For a vehicle whose engine is stopped for example, in particular when the outside temperature is hot, this function prevents the spread of gasoline vapors in the air. This function can also be used when the vehicle is in motion. Increasingly strict regulations require not releasing these vapors into the atmosphere and trapping them in an absorber, generally filled with activated carbon.

It is conventional to integrate pressure control valves into these fuel vapor recovery lines in order to regulate the pressure inside the fuel tank and the pressure inside the vapor absorber, also commonly called a "canister".

Often, multi-way control valves may be placed on the fuel vapor intake line, upstream of an inlet port formed on a cover of the fuel vapor absorber.

In some examples, they are placed directly on or in the vapor absorber (canister).

From document US 2009/0293726, vapor tanks provided with a control module mounted on a cover to allow certain operations (purging by aeration, removal/return of vapors) are thus known. The assembly of this kind of module can be complex and does not allow flexibility.

Document WO 2011/067753 provides for mounting an independent module of the inner side of a trap forming or associated with a vapor absorber, in order to avoid gasoline losses. As shown in FIGS. 9A to 10D of that document, it is then necessary to install a multi-way valve for regulating the pressures of the flow of fuel vapors, in order to return the vapors to the fuel tank or else introduce fuel vapors into the vapor storage unit, by opening and/or closing check valves sensitive to variations in differential pressure. In this type of assembly, there is also no flexibility offered: the shapes and dimensions of the interface of the vapor absorber housing must be precisely adapted to the module, in particular in order to create two fluidtight housing/valve areas (one towards an air vent, the other to separate the adsorption area from the area in direct communication with the fuel tank).

There is therefore a need for simpler assembly solutions in order to integrate a pressure regulation function more easily while allowing more versatility.

OBJECTS OF THE INVENTION

The present invention aims to overcome one or more of the aforementioned disadvantages by proposing a pressure regulating device, suitable for a gasoline vapor absorber, which is simpler to integrate.

To this end, the invention relates to a pressure regulating device for a fuel vapor absorber (which is placed, for example, on an air venting circuit) containing a purification product, generally an adsorption product, capable of fixing gaseous fuel molecules, the device comprising:
- a housing member having an inner face and an outer face, intended to form all or part of a casing of the fuel vapor absorber;
- an orifice formed in the housing member and passing through a housing member wall portion defined between the inner face and the outer face;
- a fuel vapor supply pipe, the pipe extending (typically about a longitudinal axis) between a first end and a second end; and
- a valve provided with a valve body and closure member, making it possible to regulate the circulation of fluid through the orifice;

the pipe being arranged so as to:
- pass through the wall portion, by introducing an insertion portion of the pipe into the orifice;
- be fixed (preferably directly fixed) to the housing member, so as to form at least a first annular sealing area around the pipe; and
- constitute a mounting support for all or part of the valve, for example in order to house the valve at least partially on the inner face side.

With this design, the valve does not require any particular adaptation with respect to the housing member, the pipe member being sufficient to support the valve. The valve mounting location can be part of the inside volume of the absorber.

Once attached, the pipe can typically have an insertion portion (inserted into the orifice) which extends projecting substantially outwards relative to the wall portion of the housing member. This insertion portion includes the first end, which for example forms a male connector for a hose or flexible pipe that is part of the ventilation line of the fuel tank.

Advantageously, only the pipe is in contact with the housing member and it is possible to eliminate any additional sealing contact for the placement of the valve. For example, the valve may simply be snap-fitted onto the pipe.

According to one feature, the pipe consists of a tube (tubular fitting) formed as one piece, typically having a second end wider than the first end. The tube may have a relief such as an external bead making it possible to form a sealed contact area with a pipe or hose of the ventilation line.

According to one feature, the wall portion is perpendicular to the longitudinal axis of the pipe and is itself formed in a projection protruding outward from the housing member.

Preferably, the valve extends at least partially into a cavity defined by this projection. This type of arrangement corresponds to a good compromise between the accessibility of the tube or similar form of connection of the pipe and the compact integration of the valve, by optimizing the inside volume of the absorber.

According to one feature, a sealing member of the closure member is placed in contact with or inside the pipe, at least in a position closed off by the closure member preventing fuel vapors from leaving the pipe through the second end. This arrangement makes it possible to integrate all or part of the valve towards the second end of the pipe, while minimizing the space occupied by the valve.

In various embodiments of the pressure regulating device according to the invention, one or more of the following arrangements may possibly be used:
- the valve body and/or the closure member of the valve is (are) entirely housed on the inner face side.

a direct sealing contact between an outer face of the pipe and a single-piece part forming the wall portion of the housing member, which is established circumferentially, is included in the first annular sealing area.

said first annular sealing area comprises a continuous welded annular area or at least two continuous welded annular areas arranged concentrically (with this type of attachment, a robust configuration of the functional housing member is obtained, ready for mounting on a complementary housing component).

the valve body is traversed by a central axis coincident with the longitudinal axis of the pipe.

the closure member is slidably movable parallel to the longitudinal axis while being guided by at least one among:
a tubular wall of the valve body;
an elastic return member which itself is guided in translation by the valve body;
a guide portion formed by the second end of the pipe.

the closure member has a rigid member guided parallel to the longitudinal axis and a flexible sealing member mounted on the rigid member, capable of engaging against a seat surface formed by the valve body, in a closed position of the closure member.

at a distance from the seat surface, a second annular sealing area is permanently formed in the mounted state of the valve on the pipe, by direct contact between:
the pipe; and
an annular seal supported by the valve body or an annular sealing relief directly formed on the valve body.

the closure member has a rigid member guided parallel to the longitudinal axis and a flexible annular sealing member mounted on the rigid member, preferably in a circumferential groove of the rigid member, a second annular sealing area being formed by a direct contact between the pipe and the sealing member in a closed position of the closure member.

a seat surface, on which the valve engages in the closed position of the valve, may be formed by the pipe and is used to constitute the second sealing area (in this case, it is advantageously permitted to use only one technical seal to achieve both the radial sealing of the pipe-closure member and the sealing of the closed-off axial opening of the pipe, towards the second end).

the housing member is a part which may further have at least one additional orifice, preferably two additional orifices, in order to:
define an air intake port without passage through the pipe,
form an outlet allowing the discharge of clean gases (having undergone purification typically by adsorption of gasoline vapors on an adsorbent material present in the inside volume of the absorber).

the orifice for the intake of fuel vapors and the additional orifice(s) are advantageously formed on the same side (on the top in practice) of the fuel vapor absorber.

the pipe is designed independently of the housing member, whereby a portion of the pipe, complementary to the insertion portion and comprising the second end, forms an attachment and adaptation interface for connecting the valve, preferably by snap-fitting.

the second end has retaining means, for example in the form of an annular groove, recesses, or windows, for receiving lugs projecting radially outwards formed on a peripheral outer face of the valve body.

the recesses or windows form anti-rotation retaining means for preventing the valve body from rotating (which avoids stresses in the case where an annular seal is also provided on the valve body in order to form a fluidtight area against the pipe).

the valve is of the type that is removable from the pipe, the valve body being plastic and having elastically deformable members in order to disengage from the pipe retaining means.

According to one feature, the closure member is adapted to present:
two configurations, one corresponding to a position of the closure member away from a seat surface in order to allow fuel vapors, coming from a channel of the pipe which extends to the first end, to pass through the valve in a first flow direction, and the other corresponding to a closed position of the closure member in which the closure member is biased by a return force of an elastic return member and kept in sealed annular contact with the seat surface while preventing said first flow direction,
optionally a third configuration in which a sealing member of the closure member has an elastically deformed shape while the closure member is biased by the elastic return member towards the seat surface, so as to allow a second flow direction opposite to the first flow direction in order to return fuel vapors into the pipe channel.

Also proposed is a fuel vapor absorber (for example an absorber intended to be placed on a venting circuit), comprising an air intake port, a housing component, for example in the form of a receptacle or bowl, and the purification device according to the invention in a manner that includes the fuel vapor supply pipe, which is distinct/separate from the air intake port and adapted to be connected to a ventilation line of a fuel tank, knowing that the housing member is fixed on the housing component or receptacle in a sealed manner in order to form a housing which defines an inside volume, in which adsorption means which include at least one adsorption product capable of fixing gaseous fuel molecules are contained within the inside volume.

According to one particular feature, at least three tubes are provided (for example exactly three tubes/fittings) having specific respective functions, these tubes being:
the vapor supply tube (for vapors coming from the tank),
the engine air intake tube which injects purified air into the engine,
and a purge tube which allows air into the absorber; in effect this tube typically has two functions, since it enables purging the carbon by the introduction of air but it also enables expelling the purified air to the outside environment (the purified air is generally sent outside in the stopped phases of the engine if necessary or when it is no longer possible to send air to the engine intake).

Optionally, the tubes extend on the same side of the absorber.

According to one feature, the housing member is a one-piece cover on which are formed the air intake port, the orifice for the insertion of the pipe, and an additional orifice allowing the admission of purified air to the engine.

According to one feature, the housing member extends opposite a bottom wall of the receptacle and located above a side wall of the housing, the housing member being detachably and sealingly fixed to the side wall.

According to one feature, the housing member is typically made as one part, preferably of plastic.

Alternatively, the housing member is made as at least two parts sealingly assembled to one another.

Also proposed is an assembly method for obtaining a functional housing member (in particular functional for regulating the internal pressure of an absorber), intended to form part of a fuel vapor absorber which can be connected to a ventilation line of a fuel tank (the absorber typically being placed on a venting circuit associated with the tank), the assembly method being carried out using a fuel vapor supply pipe which extends (about a longitudinal axis) between a first end and a second end, the pipe being able to be, towards the second end, wider at least in part than an insertion portion of the pipe which includes the first end, the assembly method comprising the steps consisting essentially of:

a) inserting the insertion portion of the pipe into an orifice passing through a housing member, preferably so that the insertion portion extends projecting substantially outwards relative to a wall portion of the housing member which defines the orifice;

b) mounting a valve on the pipe, and preferably towards the second end, so that the valve is at least partially housed on the inner face side, while allowing the valve to regulate the flow of fluid through the orifice, the valve being provided with a valve body and a closure member;

c) forming an annular sealing area between pipe-housing member, around the pipe, by a permanent attachment which renders the pipe integral with the housing member; whereby, after steps a), b), and c), the housing member is obtained that is functional for regulating the admission of fuel vapors and suitable for attachment on a complementary housing component or a receptacle, containing an adsorption product used to fix gaseous fuel molecules.

This type of assembly makes it possible to make clever use of a part forming a pipe for mounting the valve on the inner side of the wall member, the pipe then forming an adaptation interface between the valve and the absorber housing.

The valve may be simple, for example of the one-way type, and may be designed independently. It is therefore possible to manufacture a significantly greater number of copies of the valve than the number of absorbers in the same product line, by connecting the valve to different adapter pipes.

Optionally, an annular sealing area between valve-pipe may be created during step b), either permanently in the assembled state, or for a default position of the closure member engaged against the pipe, in a state of the closure member biased by an elastic return member that is part of the valve.

BRIEF DESCRIPTION OF THE DRAWINGS

Other features and advantages of the invention will be apparent from the following description of several embodiments, given as non-limiting examples, with reference to the accompanying drawings in which:

FIG. 6 is a sectional view illustrating the upper part of the absorber of FIG. 5, and showing a second embodiment of the pressure regulating device, FIG. 7 is a sectional view illustrating the lower part of the absorber of FIG. 5;

FIG. 8 shows details of FIG. 6.

DESCRIPTION OF PREFERRED EMBODIMENTS OF THE INVENTION

Figure 3:
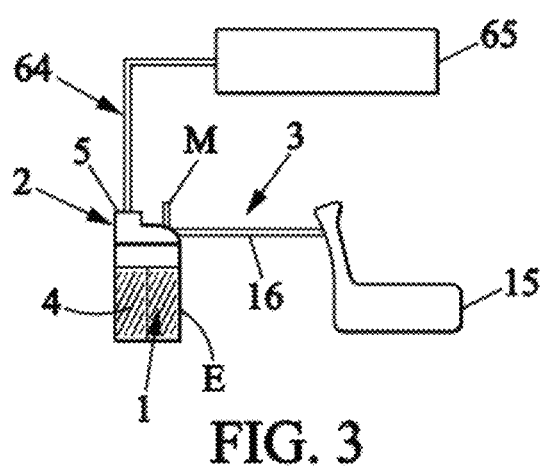
FIG. 3 is a diagram of the circuit of vapors coming from a fuel tank, illustrating a fuel vapor absorber in particular.

In the various figures, identical references indicate identical or similar elements. With reference to FIGS. 1, 3, 6, and 7, the fuel vapor absorber 1 is of the type fitted with a pressure regulating device 2 in order to allow the fuel vapors to enter the inside volume V only in cases of a positive pressure difference at the fuel tank side. Venting is also permitted by the absorber 1, which here is placed on the venting circuit 3 as is schematically represented in FIG. 3.

The absorber 1 can have an external casing E to define the inside volume V. With reference to FIG. 3, the absorber 1 is connected to the fuel tank 15 by a ventilation line 16. As the fuel temperature increases at the tank 15, the vapor flows into the ventilation line 16 and enters the inside volume V of the absorber 1, through the vapor inlet formed by a pipe 8 integral to a housing member 5 of the absorber 1. The first end 9a, narrow here, of the pipe 8 forms the connector for attachment with the ventilation line 16, while the second end 9b (FIG. 2) or 109b (FIG. 8) of this pipe 8 serves as an attachment interface both for connection to the housing member 5 and for mounting a valve 10 or 110.

Figure 1:
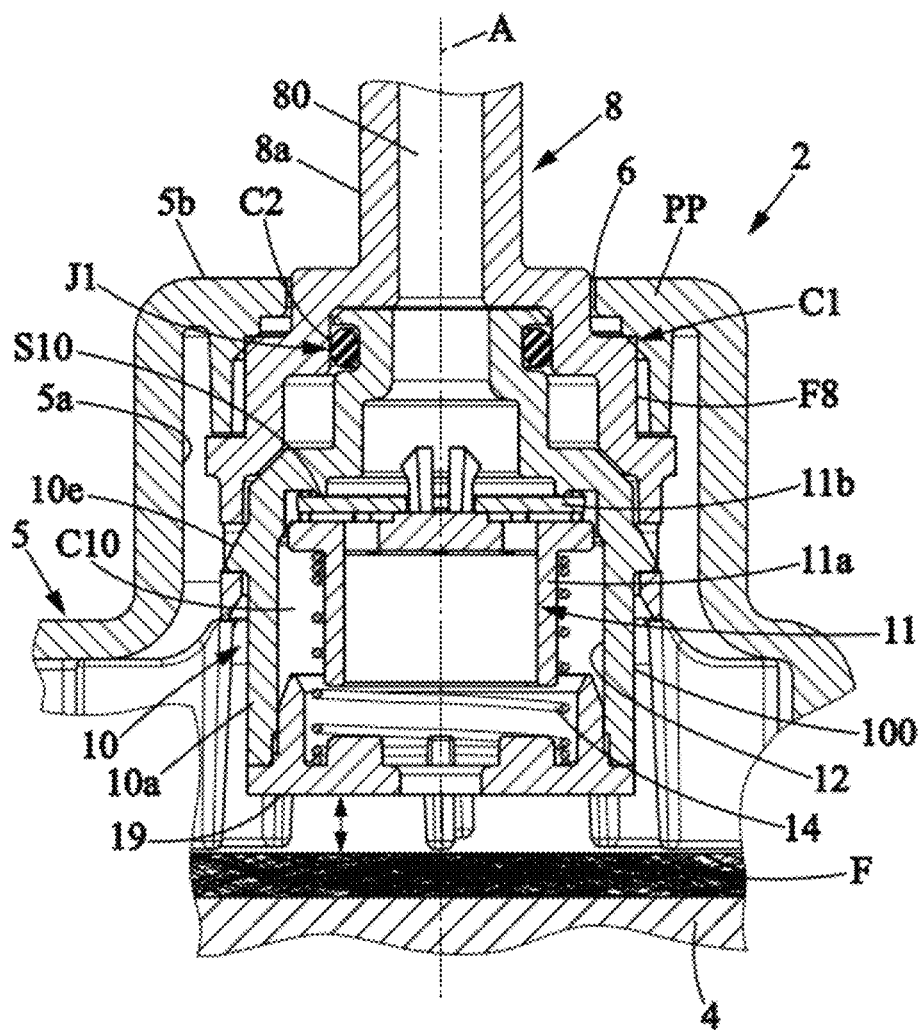
FIG. 1 is a sectional view of a pressure regulating device according to a first embodiment of the invention.

With reference to FIGS. 1 and 6, the vapor in fact passes through the orifice 6 equipped with the assembly constituted by the pipe 8 and the valve 10 or 110, provided that the pressure is sufficient towards the fuel tank 15. During operation, the vapor can form a mixture of air/fuel. In the absorber 1, this vapor can diffuse into internal chambers C4 containing an adsorption product 4, typically granules of activated carbon.

Here, the housing 30 which constitutes the casing E is provided with several communicating compartments of which at least a part forms the internal chambers C4 filled with activated carbon. On the side opposite to the housing member 5 provided with connection tubes or similar fittings, a movable compression plate P is provided, clearly visible in FIG. 7. This movable compression plate P is mounted to press against an elastic return force, here exerted by a set of springs 34 engaged against a bottom wall 31 of the housing 30. In a preferred option, it may be arranged to install one compression plate per compartment or internal chamber C4.

As illustrated in FIGS. 1 and 6, plates or similar members based on felt F or filtering elements retaining the impurities are typically placed near the inlet tubes in order to filter dust, droplets of liquid fuel, or other impurities.

Thus, near the pressure regulating device 2, less than 10 mm from an end of the valve 10 or 110 that is opposite to the pipe 8, a felt-based plate F extends in a plane perpendicular to the longitudinal axis A of the pipe 8. In the example of FIG. 1, the distance between the felt-based plate F and the end piece 19 or other similar end of the valve 10 may be between 1 and 5 mm (approximately 3 mm in the illustrated case).

Figure 5:
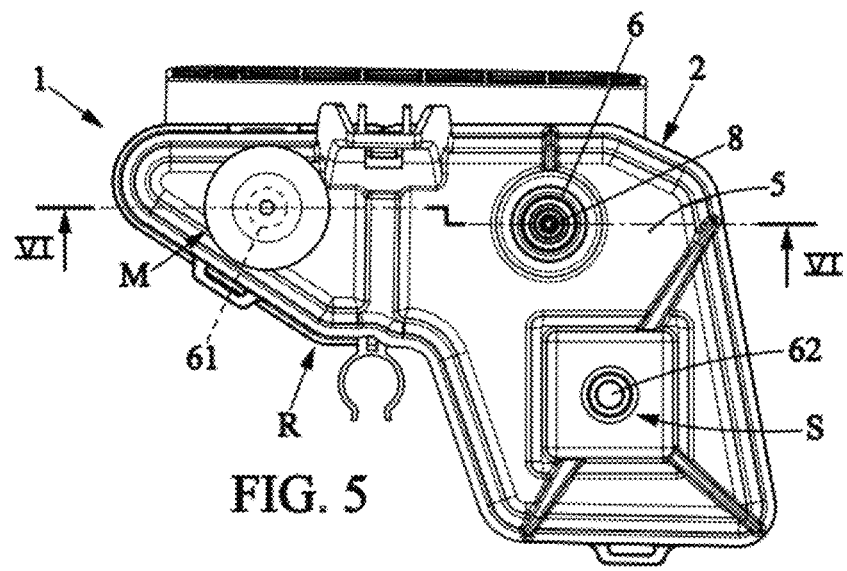
FIG. 5 is a top view of a fuel vapor absorber according to the invention, comprising the pipe inserted through the wall member, with the insertion portion of the pipe visible.

With reference to FIGS. 5 and 6, the housing member 5 is here presented in the form of a cover, closing the receptacle R or closing a complementary housing component to form the casing E. The housing member 5 may have several passages, for example three passages, communicating with the inside volume V:

the orifice 6 formed in the housing member 5 and passing through a wall portion PP delimited between the inner face 5a and the outer face 5b;

an additional orifice 61 making it possible to form an air intake port M without passage through the pipe 8;

another additional orifice 62 forming an outlet S enabling the discharge of clean gases, the outlet S typically being in communication with the air intake (via a return line 64 and a manifold 65 for example) of an internal combustion engine.

One can see that the pipe 8 is attached to the housing member 5, for example by being welded in an edge area defining the orifice 6 or close to the orifice 6. The fact that the fuel vapor intake pipe 8 is attached on the housing member 5 facilitates the manufacture this housing member 5 when it has two relatively close parallel tubes/fittings. Indeed, unmolding two tubes side by side would be difficult due to the lack of space for the passage of sliders. A compact design of a housing member 5 which combines the functions of connection and pressure regulation can thus be obtained.

The valve 10 illustrated in FIGS. 1, 2, and 4 and its mounting method will now be described in more detail.

Figure 2:
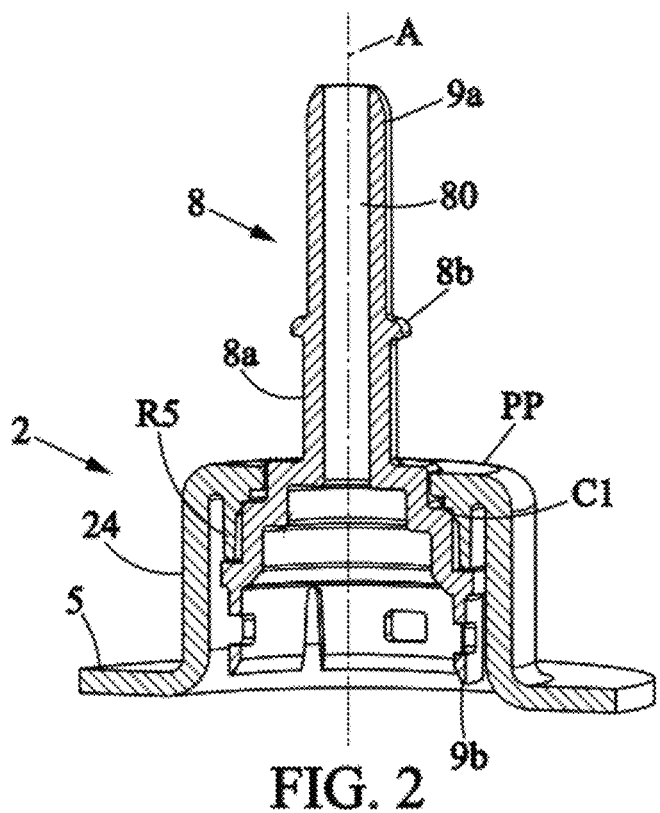
FIG. 2 shows the sectional view of FIG. 1 but selectively illustrates the housing member and the pipe.

With reference to FIGS. 1 and 2, the pipe 8 constitutes a mounting support for all or part of the valve 10, towards its second end 9b. The inner face of this second end 9b forms an area for hooking latching means or other quick connection elements located on the valve 10. More generally, it allows fitting the valve 10 into the pipe 8 such that the second end 9b surrounds the valve 10.

Figure 4:
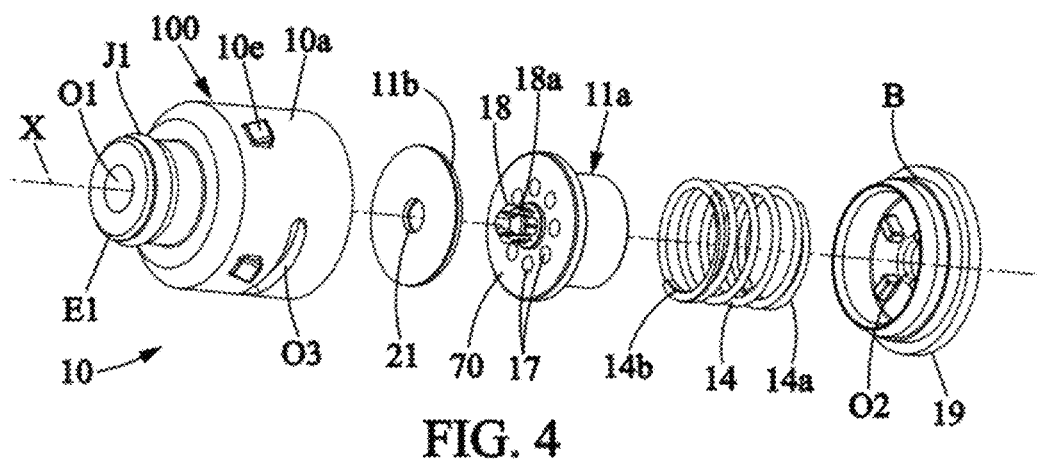
FIG. 4 is an exploded perspective view of the valve used in the device of FIG. 1.

In the first embodiment, corresponding to FIGS. 1, 2, and 4, the valve 10 has a valve body 10a of which the proximal end is engaged against the pipe 8. The valve body 10a may include a tubular main part 100 which extends around the closure member 11, forming a side wall, and a terminating piece consisting of an end piece 19. The tubular main part 100 forms the proximal end E1 which is the closest end to a narrow inlet channel 80 of the pipe 8.

The tubular main part 100 has a central proximal opening O1, typically as narrow as the inlet channel 80 (with substantially the same inner diameter in the example illustrated). Here the valve body 10a abuts axially against, by the proximal end E1, the end of the narrow channel 80, in a widening area of the pipe 8 as is clearly visible in FIG. 1.

A channel C10 of the valve 10, for example generally axial and externally defined by the tubular main part, extends the narrow channel 80 and can be closed off by the closure member 11, by the use of a flexible sealing member 11b. The sealing member 11b here is a diaphragm mounted on a flange 70. The flange 70 is formed at the end of a rigid member 11a, this rigid member 11a and the sealing member 11b able to form the closure member 11. The closure member 11 here remains movable inside the tubular main part 100, moving in parallel to an axis X of the valve 10 which corresponds to the longitudinal axis A of the pipe 8.

The guiding of the closure member 11 is linear guiding by a section, preferably cylindrical, of the tubular wall 12 formed by the valve body 10a. This section makes it possible to guide the movement of the flange 70. Optionally, the spiral design of the spring forming the elastic return member 14, itself held and/or guided in translation by the valve body 10a, can also participate in guiding the closure member 11.

A fixed seat surface S10 is formed by the tubular main part 100, for example by an internal shoulder of the tubular main part 100. In this case, the type of contact on the seat surface S10 can be axial.

The tubular main part 100 is also provided with:
  an enlarged opening opposite the narrow channel 80, this enlarged opening being closed by the end piece 19; and
  at least one intermediate side opening O3 formed on a side, at an axial distance from the proximal end E1.

Inside the valve body 10a formed by the tubular main part 100 and the end piece 19, the closure member 11 can move against the return force of a spring or other elastic return member 14. The closure member 11 typically moves within a wider area, inside the internal cavity of the valve body 10a, than the area the narrow channel 80 opens into. In this wider area, at an axial distance from the proximal end E1, the spring, which may be a spiral spring, has for example a fixed end 14a bearing against the end piece 19 and a movable end 14b bearing against the flange 70 formed by the rigid member 11a.

The fixed position of the valve body 10a is made possible:
  by snap-fastening or similar attachment onto the second end 9b of the pipe 8,
  combined with a permanent attachment of the pipe 8 to the housing member 5, for example by welding (vibratory welding for example), so as to form at least a first annular sealing area C1 around the pipe 8.

For example the second end 9b has retaining means, for example in the form of an annular groove, recesses, or windows, making it possible to receive lugs 10e projecting radially outwards, formed on a peripheral outer face of the valve body 10a. A variable number of lugs 10e may be used, for example three or four. These lugs 10e, for example made from and integral with the wall 12 of the part 100, can cooperate with retaining means spaced apart from each other and having an anti-rotation effect, to prevent the valve body 10a from rotating relative to the pipe 8. Of course, a similar attachment can be obtained by using lugs or projecting reliefs formed internally in the second end 9b of the pipe 8 in order to form catches which engage with corresponding recesses in the outer face of the valve body 10a.

The annular seal J1, supported by the valve body 10a towards the proximal end E1, engages in radial sealing contact against an inner face of the pipe 8 placed in the widened area of the pipe 8. A second annular sealing area C2 is thus formed, supplementing the first annular sealing area C1 so that no fluid can flow:
  from the outside to the inside or vice versa between the pipe 8 and the edge of the orifice 6 formed by the wall portion PP,
  from the outside to the inside or vice versa between the pipe 8 and the outer face of the valve body 10a.

In other words, to exit or enter the absorber 1, fuel vapors must pass through the channel C10 of the valve 10 which extends the narrow channel 80 and which can be sealed closed by the closure member 11. The second annular sealing area C2 is typically located at a distance from the seat surface S10 and it is permanent in the mounted state of the valve 10 on the pipe.

In alternative embodiments, the seal J1 may optionally be eliminated and replaced by a sealing lip or other annular sealing relief directly formed on the valve body 10a.

In this first embodiment, the use of a diaphragm to form the sealing member 11b may be preferred because this makes it possible to control both an incoming flow and an outgoing flow. The valve 10 is then a two-way valve. For this purpose, the sealing member 11b, which is of annular shape and small thickness (for example less than 3 mm, without this being limiting), can be kept integral with the flange 70 by a projection, retaining tabs 18, or other member(s) for clipping the sealing member 11b in place by traversing the central opening 21 of said member. One will note that retaining tabs 18 allow a degree of freedom in the sliding of a central portion of the sealing member 11b, making it possible to obtain a configuration of the sealing member 11b relative to the radial portion of the flange 70 that is domed and distanced (at least along the retaining tabs 18). It is thus possible to form a central flow passage 18a between the retaining tabs 18, for the fuel vapors. Given the presence of openings 17, for example axial openings, through the flange 70, a configuration for the sealing member 11b that is domed in the direction of the channel 80 makes it possible to establish communication between an internal area of the channel C10 situated behind the flange 70, on the side opposite to channel 80, and an internal area of the channel C10 adjacent to the narrow channel 80 of the pipe 8.

The retaining effect by the retaining tabs 18 allows the entry of fuel vapors in the event of a positive pressure differential towards the tank 15. Indeed, the sealing member 11b is then integral in sliding towards the rear of the rigid member 11a including the flange 70. The vapors coming from the narrow channel 80 can circulate inside the valve body 10a, between the outer edge of the sealing member 11b and the inner face of the tubular main part 100, before leaving the valve 100 through at least one of the openings O2, O3. Here, opening O2 is formed axially in a base portion B that is part of the end piece 19. This opening O2 constitutes a distal opening of the outer body 10a of the valve 10.

More generally, it is understood that the valve 10 may have a single flexible member 11b allowing two directions of fluid flow: an incoming first direction and an outgoing second direction. The membrane or similar deformable elastic part forming this flexible member 11b is able to move/shape itself from one position to another via the pressure differences between the fuel tank 15 and the storage area of the absorber 1. In other words, via the variations in position or shape of the flexible member 11b, the valve 10 makes it possible to regulate the flow of fluid through the orifice 6.

If there is overpressure in the reservoir 15, this exerts thrust on the flexible member 11b and the piston or similar rigid member 11a supporting the flexible sealing member 11b. In the first embodiment illustrated, this leads to compression of the coil spring (or other elastic return member) and the passage of the flow of fuel vapors towards the adsorption product storage area is permitted, in the first flow direction.

The return of these stored vapors to the fuel tank 15 is effected by means of any type of passage through members 11a and 11b, here in the form of the openings 17 and passage(s) 18a formed on the flange 70 of the rigid member 11a forming a piston, and by at least one opening 21 or passage through the thickness of the flexible member 11b. In the preferred options, the area for the passage of gas, which is formed between the flexible member 11b and the rigid member 11a, is formed only in the state of maximum extension or elongation of the elastic return member 14 and in a deformed state of the membrane forming the sealing member 11b. In practice, the elastic return member 14 is in a high position, in other words a position of maximum thrust of the closure member 11 against the seat surface S10. These conditions specific to the second flow direction are met only for a negative pressure difference.

With this second flow direction for the case of a negative pressure differential (reverse flow direction), vapors are discharged via the orifice 6 through the narrow channel 80. In this case, the outer edge of the sealing member 11b can be considered to be kept in contact against the seat surface S10, while a flow of vapors circulates towards the narrow channel 80 by passing successively through:

opening O2 and/or openings O3, formed in the valve body 10a (openings O2, O3 typically located outside of the pipe 8), the openings 17 which are radially closer to the central axis X of the valve 10 than the seat surface S10, the central flow passage 18a, between the retaining tabs 18, made accessible due to a spacing/separation at the center (from the effect of the negative pressure towards the channel 80) of the sealing member 11b, and the central opening 21 of the sealing member 11b.

Of course, the valve 10 can be implemented differently, for example without using a diaphragm to form the sealing member 11b and/or by using at least two movable members forming separate closure members.

Examples of attachment of the pipe 8, preferably by welding, will now be described with reference to FIGS. 1, 2, 6, and 8.

The pipe 8 may optionally be designed symmetrically around the longitudinal axis A. More generally, the pipe 8 has a typically straight insertion portion 8a which is inserted through a wall portion PP of the housing member 5, into the orifice 6. In FIGS. 1 and 2, the wall portion PP is formed by a transverse portion (perpendicular to the longitudinal axis A). The wall portion PP may be formed in a projection 24 protruding outwardly from the housing member 5. This arrangement makes it possible to house the valve 10 at least partially in the cavity defined by this projection 24.

The wall portion PP may have a relief R5, here an annular internal relief projecting from the inner face 5a. This annular relief R5 makes it possible to form one or more areas for welding with a peripheral area of the pipe 8, for example a peripheral area where the pipe widens. In other variants, this type of connection R5 is not provided. Optionally, a welded area may be formed on a collar or shoulder of the pipe 8, which is joined to the inner face 5a in an area bordering the orifice 6.

The welding is of the vibratory type, with friction between the parts 5 and 8 to produce heat which has the effect of fusing the hot-melt materials, typically plastics, of these parts. A vibrating tool that is known per se is used to perform this type of welding (the frequencies may be in the ultrasonic range, for example from 20 kHz to 70 kHz.).

Typically, the widening of the pipe 8, formed on the side opposite the first end 9a (for example in the extension of the insertion portion 8a) can make it possible to contain at least a portion of the valve 10 or 110 in order to house it as close as possible to the narrow channel 80 and, in this case, the welded area is formed on an annular section of the pipe radially interposed between the valve 10, 110 and the relief R5 or other portion of the housing member 5. This case is encountered in the first embodiment, as can be seen in FIG. 1, or in the second embodiment, as can be seen in FIGS. 6 and 8.

In the second embodiment, it is also possible to guide the closure member 111 of the valve 110, for example using a guide portion 13 formed at the second end 109b of the pipe 8. In this case, the closure member 111 may have teeth 25 spaced apart from one another or other axially protruding projections sliding along the inner face of the guide portion 13. This design, here with at least two or three teeth 25, may be preferred in order to economize the material of the closure member and reduce the contact surfaces and associated friction between the guide portion 13 and the rigid member 111a including these teeth 25.

In the examples shown and without limitation, the insertion portion 8a may project outwards relative to the wall portion PP of the housing member 5. The first end 9a may be narrower than the second end 9b or 109b, in order to be able to pass through the orifice 6 and form a male connection for a pipe or hose of the ventilation line 16 of the fuel tank 15. At least one annular external relief 8b, formed on the insertion portion 8a, can facilitate establishing the seal with the ventilation line 16. The pipe 8 may be completely rigid and is for example produced in the form of a one-piece tube, typically elongated in the direction of the longitudinal axis A.

One or more welds may be made to form a direct sealed connection between an outer face F8 of the pipe 8 and the single-piece part forming the wall portion PP of the housing member 5. The contact area or connection corresponds to an annular sealing area C1 (with for example two parallel welds in this area Z1, arranged concentrically).

With reference now to FIGS. 5 and 6, the fuel vapor supply pipe 8 may be distanced from the air intake port M such that the inside compartment, forming a first internal chamber C4 underlying the valve 10 or 110 within the inside volume V of the casing E, is separated (here by a partition 23) from another compartment that underlies orifice 61.

The housing member 5 typically forms a single-piece cover, on which are formed the air intake port M, the orifice 6 for insertion of the pipe 8, and an additional orifice 62 for releasing gases purified by the adsorption means (for return to the intake). A tube/fitting may be used to form the outlet S and to allow quick and easy connection of a hose connected to an engine intake. In one option, a tube may also be provided for the entry of air, facilitating connection of a hose which is useful for the activated carbon purging operations.

The spaced-apart distribution of the orifices 6, 61, 62, clearly visible in FIG. 5, corresponds to a preferred option. The distance, measured perpendicularly to the longitudinal axis A, between the pipe 8 and orifice 61 for air intake M in the event of the absorber being purged, or between the pipe 8 and orifice 62 provided for the exit S of vapors, may possibly be greater than 30 or 40 mm, which simplifies the design of the housing member 5. This can also facilitate the successive integration of functional components into the respective orifices 6, 61, 62 during the assembly phases.

The casing E of the absorber 1 may be made of any suitable material, for example chosen among the molded thermoplastic polymers. A polyamide or other resistant and rigid polymer material may be preferred. The casing E, which contains the adsorption product 4 capable of fixing gaseous fuel molecules in one or more of the internal chambers C4, may be defined by the housing member 5 and a receptacle R or bowl having a bottom wall 31 and a side wall 32. There may be communication between several of the internal chambers C4.

The connection L between the housing member 5 and the side wall 32 may be permanent, resulting from welding, or may be of the removable type. The annular connection 33 between the part forming the bottom wall 31 and the side wall 32 may be a weld. More generally, the housing 30 serving to define the casing E may be implemented from a variable number of parts, and makes it possible to keep the inside volume V sealed, at least under the conditions of use (pressure differential) corresponding to the accumulation of fuel vapors in the absorber 1.

A pressure regulating device 2 designed according to a second embodiment will now be described with reference to FIGS. 5, 6, and 8.

Here, the closure member 111 of the valve 110 comprises a rigid member 111a which is biased towards the seat surface S10 by the coil spring forming the elastic return member 14. The mobility of closure member 111 is similar to the mobility of closure member 11, parallel to the longitudinal axis A which is coincident with the central axis of the valve 110. Unlike the first embodiment, the seat surface is defined by the pipe 8, here at the second end 109b as is clearly visible in FIG. 8. The second end 109b thus defines all of the following:
- a retaining relief on the outer side (for example an annular groove G),
- a guide surface on the inner side, and
- a seat surface, formed at the annular edge which may have a beveled or rounded profile and/or in an area of the guide surface.

The valve 110 is of simplified design and only allows circulation in the event of a positive pressure differential towards the ventilation line 16 (fuel vapors coming from the tank 15). Indeed, in this case, the spring is compressed and the closure member 111 provided with the annular seal J2 forming the sealing member of the closure member 111 frees the passage, here of annular shape, between the rigid member 111a and the pipe 8.

Placing the seal J2 in contact with the pipe 8, in a closed position, makes it possible to reduce the space occupied by the valve body 110a. Here, the valve body 110a can simply consist of one part which:
- fixedly supports the fixed end 14a of the elastic return member 14; and
- is connected, typically by snap-fitting, to the groove G or similar retention relief formed on the second end 109b of the pipe 8.

Here, the valve body 110a may comprise at least two, and preferably three or four longitudinal arms 27 connected to a same base 28 to which the fixed end 14a is connected. One or more clip-forming members are provided at the free end of these longitudinal arms 27 or in at least one annular portion connected to the longitudinal arms 27 on the side opposite the base 28. Here, a bead 10b can be clipped into the annular groove G of the second end 109b. The passages between the arms 27 allow the circulation of fuel vapors from the tank 15 to the storage area of the absorber 1, in the open position of the closure member 111.

The seal J2 may be supported in a circumferential annular groove of the rigid member 111a, located axially between the teeth 25 (or similar elements serving to guide along the pipe 8) and a free edge of the rigid member 111a. The movable end 14b of the spring may be held and possibly guided within a hollow space of the rigid member 111a.

One may note that in the second embodiment, the pipe 8 is possibly identical or very similar to the one used in the first embodiment, with only the structure of the second end 9b, 109b possibly differing. Here in the case of FIGS. 6 and 8, one can see that the valve body 110a is attached by the outer face of the pipe 8, which is not necessarily the case when integrating the valve 10 of the first embodiment or a similar valve allowing two opposite directions of flow depending on the pressure conditions.

In the second embodiment, the diaphragm can be eliminated and the fixed seal J1 is also eliminated. These elements are replaced by the flexible and compressible annular seal J2, movable with the closure member 111 and forming the sealed separation with respect to the pipe. This seal J2 by itself is sufficient to prevent the return of fuel vapors towards the tank 15 when there is no overpressure on the tank 15 side.

A second annular sealing area C2 is thus formed, by the use of the seal J2, which supplements the first annular sealing area C1 typically obtained by welding between the pipe 8 and the wall portion PP.

Alternatively, the seal J2 may possibly be created integrally with the rest of the closure member 111, for example by forming an annular sealing lip or similar annular relief, bead capable of being compressed/deformed elastically. Optionally, the closure member 111 can then be implemented as one piece.

One of the advantages of a device 2 according to the invention is that it can be installed on an absorber 1 of any design. The valve 10, 110 does not form the sealing interface with the housing. The housing member 5 can thus keep the same format, which can be mounted on a wide variety of receptacles R (particularly of variable capacity).

Another advantage is the possibility of integrating a more or less complex valve on the interior side, standard where appropriate, according to requirements. This makes it possible to use valves typically of simplified design, for example with a simple and compact structure, and/or be able to disassemble the valve when necessary.

It should be obvious to those skilled in the art that the present invention allows embodiments in many other specific forms without departing from the scope of the invention as claimed.

Thus, although the drawings show a valve of simple design, without incorporating a functional component (for example for a venting or flow limitation function), it is understood that the valve 10, 110 may optionally include one or more functional components, typically assembled on the valve body 10a, 110a without interfering with the valve-pipe connection.

In the case where an air venting component is integrated, a diaphragm can be added separating the outside at atmospheric pressure and the fuel vapor input area, while an annular seal can be used around the vent area to create an annular seal between the housing and this functional component of the valve. This sealing is established at a specific outlet passage formed in the housing 30 for such venting.

Although the pipe 8 is presented as having only the insertion portion formed by a tubular member defining the main portion of the channel 80, it is understood that the pipe 8 may be arranged differently and may possibly be inserted from the outside into the orifice 6 and/or provided with an enlarged portion which extends to the outside.

Furthermore, it is understood that the specific features of the assembling to form the valve 10, 110 can be considered independently of the exact method of attachment of the pipe 8.

The invention claimed is:

1. A pressure regulating device for a fuel vapor absorber containing an adsorption product configured to fix fuel molecules, the pressure regulating device comprising:
a housing member having an inner face and an outer face, the housing member being configured to form all or part of a casing of the fuel vapor absorber;
an orifice formed in the housing member and passing through a housing member wall portion formed in the housing member between the inner face and the outer face;
a fuel vapor supply pipe extending between a first end configured to connect to a ventilation line of a fuel tank and a second end, the fuel vapor supply pipe passing through the housing member wall portion, by an insertion portion of the pipe introduced into the orifice, the fuel vapor supply pipe being fixed to the housing member to form at least one annular sealing area around the pipe; and
a valve provided with a valve body and closure member, enabling regulation of circulation of fluid through the orifice, the fuel vapor supply pipe being a mounting support for all or part of the valve,
wherein the at least one annular sealing area comprises a continuous welded annular area or at least two continuous welded annular areas arranged concentrically.

2. The device according to claim 1, wherein the closure member is provided with a sealing member that is placed in contact with or inside the pipe, at least in a position closed off by the closure member preventing fuel vapors from leaving the pipe through the second end, and
wherein the closure member is traversed by a central axis coincident with a longitudinal axis of the pipe.

3. The device according to claim 1, wherein the valve is housed at least partly on the inner face side.

4. The device according to claim 1, wherein the valve body includes a main tubular part that is distinct from the pipe and connected to the pipe,
wherein the main tubular part of the valve body is traversed by a central axis coincident with a longitudinal axis of the pipe, and
wherein the closure member is slidably movable parallel to the longitudinal axis while being guided by at least one among:
a tubular wall of the valve body,
an elastic return member which itself is guided in translation by the valve body, and
a guide portion formed by the second end of the pipe.

5. The device according to claim 1, wherein the at least one annular sealing area defines a first annular sealing area, and
wherein the closure member has a rigid member guided parallel to a longitudinal axis of the pipe and a flexible annular sealing member mounted on the rigid member, a second annular sealing area being formed by a direct contact between the pipe and the annular sealing member in a closed position of the closure member.

6. The device according to claim 1, wherein the housing member is a part which further has two additional orifices, in order to:
define an air intake port without passage through the pipe, and
form an outlet allowing the discharge of clean gases.

7. The device according to claim 1, wherein the insertion portion, which includes the first end, is inserted into the orifice so that the insertion portion extends projecting substantially outwards relative to the housing member wall portion, and
wherein the fuel vapor supply pipe includes a widening area so that the fuel vapor supply pipe has, around the valve, a section larger than the orifice.

8. A pressure regulating device for a fuel vapor absorber containing an adsorption product capable of fixing gaseous fuel molecules, the pressure regulating device comprising:
a housing member having an inner face and an outer face, the housing member being configured to form all or part of a casing of the fuel vapor absorber;
an orifice formed in the housing member and passing through a housing member wall portion formed in the housing member between the inner face and the outer face;
a fuel vapor supply pipe extending between a first end configured to connect to a ventilation line of a fuel tank and a second end, the fuel vapor supply pipe passing through the housing member wall portion, by an insertion portion of the pipe introduced into the orifice, the fuel vapor supply pipe being fixed to the housing member to form at least one annular sealing area around the pipe; and a valve provided with a valve body and closure member, enabling regulation of circulation of fluid through the orifice, the fuel vapor supply pipe being a mounting support for all or part of the valve, wherein the closure member has a rigid member guided parallel to a longitudinal axis of the pipe and a flexible sealing member mounted on the rigid member, the sealing member being configured to engage against a seat surface formed by the valve body, in a closed position of the closure member.

9. The device according to claim 8, wherein the at least one annular sealing area defines a first annular sealing area, and wherein, at a distance from the seat surface, a second annular sealing area is permanently formed in the mounted state of the valve on the pipe, by direct contact between:
the pipe, and an annular seal supported by the valve body or an annular sealing relief directly formed on the valve body.

10. The device according to claim 8, wherein the insertion portion, which includes the first end, is inserted into the orifice so that the insertion portion extends projecting substantially outwards relative to the housing member wall portion, and wherein the fuel vapor supply pipe includes a widening area so that the fuel vapor supply pipe has, around the valve, a section larger than the orifice.

11. The device according to claim 8, wherein the valve body includes a main tubular part that is distinct from the fuel vapor supply pipe and connected to the fuel vapor supply pipe, wherein the main tubular part of the valve body is traversed by a central axis coincident with a longitudinal axis of the fuel vapor supply pipe, and wherein the closure member is slidably movable parallel to the longitudinal axis while being guided by at least one of a tubular wall of the valve body, an elastic return member which is guided in translation by the valve body, and a guide portion formed by the second end of the fuel vapor supply pipe.

12. A pressure regulating device for a fuel vapor absorber containing an adsorption product capable of fixing gaseous fuel molecules, the pressure regulating device comprising:
a housing member having an inner face and an outer face, the housing member being configured to form all or part of a casing of the fuel vapor absorber;
an orifice formed in the housing member and passing through a housing member wall portion formed in the housing member between the inner face and the outer face;
a fuel vapor supply pipe extending between a first end configured to connect to a ventilation line of a fuel tank and a second end, the fuel vapor supply pipe passing through the housing member wall portion, by an insertion portion of the pipe introduced into the orifice, the fuel vapor supply pipe being fixed to the housing member to form at least one annular sealing area around the pipe; and
a valve provided with a valve body and closure member, enabling regulation of circulation of fluid through the orifice, the fuel vapor supply pipe being a mounting support for all or part of the valve,
wherein the pipe is designed independently of the housing member, whereby a portion of the pipe, complementary to the insertion portion and comprising the second end, forms an adaptation and attachment interface configured to connect the valve.

13. The device according to claim 12, wherein the insertion portion, which includes the first end, is inserted into the orifice so that the insertion portion extends projecting substantially outwards relative to the housing member wall portion, and wherein the fuel vapor supply pipe includes a widening area so that the fuel vapor supply pipe has, around the valve, a section larger than the orifice.

14. The device according to claim 12, wherein the fuel vapor supply pipe consists of a tube formed as one piece.

15. The device according to claim 12, further comprising a single-piece part forming the housing member wall portion, which is established circumferentially, wherein the at least one annular sealing area comprises a direct sealing contact between an outer face of the pipe and the single-piece part forming the housing member wall portion.

16. A fuel vapor absorber comprising:
an air intake port;
a housing component or receptacle; and
the device according to claim 12,
wherein said fuel vapor supply pipe being separate from the air intake port and configured to be connected to a ventilation line of a fuel tank,
wherein the housing member is fixed on the housing component or receptacle in a sealed manner in order to form a housing which defines an inside volume, an absorption system including at least one adsorption product configured to fix gaseous fuel molecules being contained within the inside volume.

17. The fuel vapor absorber according to claim 16, wherein the housing member is a one-piece cover on which the air intake port, the orifice for the insertion of the pipe, and an additional orifice configured to discharge gases purified by the adsorption system are disposed.

18. A pressure regulating device for a fuel vapor absorber containing an adsorption product capable of fixing gaseous fuel molecules, the pressure regulating device comprising:
a housing member having an inner face and an outer face, the housing member being configured to form all or part of a casing of the fuel vapor absorber;
an orifice formed in the housing member and passing through a housing member wall portion formed in the housing member between the inner face and the outer face;
a fuel vapor supply pipe extending between a first end configured to connect to a ventilation line of a fuel tank and a second end, the fuel vapor supply pipe passing through the housing member wall portion, by an insertion portion of the pipe introduced into the orifice, the fuel vapor supply pipe being fixed to the housing member to form at least one annular sealing area around the pipe; and
a valve provided with a valve body and closure member, enabling regulation of circulation of fluid through the orifice, the fuel vapor supply pipe being a mounting support for all or part of the valve,
wherein the closure member is configured to present three configurations,
a first one of the configurations corresponding to a position of the closure member away from a seat surface in order to allow fuel vapors, coming from a channel of the fuel vapor supply pipe which extends to the first end, to pass through the valve in a first flow direction, a second one of the configurations corresponding to a closed position of the closure member in which the closure member is biased by a return force of an elastic return member and is kept in sealed annular contact with the seat surface while preventing said first flow direction, and a third configuration in which a sealing member of the closure member has an elastically deformed shape while the closure member is biased by the elastic return member towards the seat surface, to allow a second flow direction opposite to the first flow direction in order to return fuel vapors into the channel of the fuel vapor supply pipe.

19. The device according to claim 18, wherein the insertion portion, which includes the first end, is inserted into the orifice so that the insertion portion extends projecting substantially outwards relative to the housing member wall portion, and wherein the fuel vapor supply pipe includes a widening area so that the fuel vapor supply pipe has, around the valve, a section larger than the orifice.

\* \* \* \* \*